(12) United States Patent
Zhang et al.

(10) Patent No.: US 11,328,135 B2
(45) Date of Patent: May 10, 2022

(54) RADIO FREQUENCY IDENTIFICATION SYSTEM, METHOD FOR CONSTRUCTING RELAY NETWORK, READER, AND REPEATER

(71) Applicant: HUAWEI TECHNOLOGIES CO., LTD., Guangdong (CN)

(72) Inventors: Huaizhi Zhang, Chengdu (CN); Sunjie Wang, Chengdu (CN); Bo Han, Shenzhen (CN); Lang Wang, Chengdu (CN); Mei Jian, Shenzhen (CN); Junfeng Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/030,915

(22) Filed: Sep. 24, 2020

(65) Prior Publication Data

US 2021/0004544 A1    Jan. 7, 2021

Related U.S. Application Data

(63) Continuation of application No. PCT/CN2019/079958, filed on Mar. 27, 2019.

(30) Foreign Application Priority Data

Mar. 28, 2018    (CN) .......................... 201810267215.8

(51) Int. Cl.
*G06K 7/00*    (2006.01)
*G06K 7/10*    (2006.01)

(52) U.S. Cl.
CPC ....... *G06K 7/0008* (2013.01); *G06K 7/10178* (2013.01); *G06K 7/10356* (2013.01)

(58) Field of Classification Search
CPC ............. G06K 7/0008; G06K 7/10178; G06K 7/10356; H04B 5/0031; H04B 5/0056;
(Continued)

(56) References Cited

U.S. PATENT DOCUMENTS 7,606,530 B1    10/2009    Anderson et al.
10,326,518 B1 *  6/2019    Magley .............. H04B 7/15528
(Continued)

FOREIGN PATENT DOCUMENTS

CN    1831841 A    9/2006
CN    106470420 A    3/2017
(Continued)

OTHER PUBLICATIONS

Supplementary European Search Report in European Application No. 19776243.8, dated Jan. 29, 2021, 14 pages.
(Continued)

*Primary Examiner* — Ryan W Sherwin
(74) *Attorney, Agent, or Firm* — Fish & Richardson P.C.

(57) ABSTRACT

This application discloses example radio frequency identification systems and example methods for constructing a relay network, a reader, and a repeater. One example radio frequency identification system includes a reader, a repeater, and a target tag. The reader can be configured to send a first signal to the repeater. The repeater can be configured to send an excitation signal to the target tag based on the first signal. The target tag can be configured to send a target backscatter signal based on excitation of the excitation signal, where the target backscatter signal carries electronic product code information. The reader can be further configured to receive the target backscatter signal and obtain the electronic product code information in the target backscatter signal.

20 Claims, 8 Drawing Sheets

(58) Field of Classification Search
CPC ... H04B 7/15528; H04B 5/0062; H04W 4/80; H04W 40/22; H04W 56/00; H04W 60/00; H04W 64/00–006; H04W 72/12; H04W 76/00; H04W 76/10; H04W 84/047; H04W 88/04

See application file for complete search history.

(56) References Cited

U.S. PATENT DOCUMENTS

| | | | |
|---|---|---|---|
| 2004/0002312 A1* | 1/2004 | Li | H04L 27/00 455/232.1 |
| 2005/0136835 A1* | 6/2005 | Suwa | H04B 7/2681 455/11.1 |
| 2005/0195814 A1* | 9/2005 | Hagiwara | H04W 12/10 370/389 |
| 2006/0208899 A1 | 9/2006 | Suzuki et al. | |
| 2008/0231449 A1 | 9/2008 | Moshfeghi | |
| 2009/0146792 A1 | 6/2009 | Sadr et al. | |
| 2010/0123559 A1 | 5/2010 | Wilkinson et al. | |
| 2010/0245053 A1 | 9/2010 | Overhultz et al. | |
| 2012/0185268 A1* | 7/2012 | Wiesner | H04B 7/15542 705/2 |
| 2015/0236777 A1* | 8/2015 | Akhtar | H04W 48/20 455/438 |
| 2016/0267453 A1* | 9/2016 | Suzuki | H04W 84/047 |
| 2016/0286590 A1* | 9/2016 | Cheng | H04W 4/08 |
| 2017/0351886 A1* | 12/2017 | Recouly | H04B 5/02 |
| 2019/0053003 A1* | 2/2019 | Cheung | H04W 4/30 |

FOREIGN PATENT DOCUMENTS

| | | | | |
|---|---|---|---|---|
| JP | 2005520441 A | 7/2005 | | |
| JP | 2006246372 A | 9/2006 | | |
| JP | 2010536189 A | 11/2010 | | |
| JP | 2011059877 A | 3/2011 | | |
| JP | 2011530751 A | 12/2011 | | |
| JP | 2017142563 A | 8/2017 | | |
| JP | 2018026030 A | 2/2018 | | |
| WO | 2004107251 A2 | 12/2004 | | |
| WO | WO2016/180153 | * | 11/2016 | H04W 12/069 |

OTHER PUBLICATIONS

PCT International Search Report and Written Opinion issued in International Application No. PCT/CN2019/079958 dated Jun. 13, 2019, 16 pages (with English translation).

Office Action issued in Japanese Application No. 2020-551987 dated Jan. 11, 2022, 8 pages (with English translation).

* cited by examiner

RADIO FREQUENCY IDENTIFICATION SYSTEM, METHOD FOR CONSTRUCTING RELAY NETWORK, READER, AND REPEATER

CROSS-REFERENCE TO RELATED APPLICATIONS

This application is a continuation of International Application No. PCT/CN2019/079958, filed on Mar. 27, 2019, which claims priority to Chinese Patent Application No. 201810267215.8, filed on Mar. 28, 2018. The disclosures of the aforementioned applications are hereby incorporated by reference in their entireties.

TECHNICAL FIELD

This application relates to the field of communications technologies, and in particular, a radio frequency identification system, a method for constructing a relay network, a reader, and a repeater.

BACKGROUND

A radio frequency identification technology is a non-contact automatic identification technology. In the radio frequency identification technology, a target object is automatically identified by using a radio frequency signal, and related data is obtained. An identification process can be implemented in a harsh environment without manual intervention.

Currently, a conventional radio frequency identification system includes a tag and a reader. An entire working process of radio frequency identification may be: sending, by the reader, an excitation signal to the tag; sending, by the tag, a backscatter signal to the reader under excitation of the excitation signal, where the backscatter signal may carry data information; and receiving and parsing, by the reader, the backscatter signal, to obtain the data information of the tag.

In the conventional radio frequency identification system, the reader directly sends the excitation signal to the tag, and the communication distance is relatively short.

SUMMARY

This application provides a radio frequency identification system, to increase a communication distance of the radio frequency identification system.

According to a first aspect, this application provides a radio frequency identification system. The radio frequency identification system includes a reader, a repeater, and a target tag. The reader is configured to send a first signal to the repeater. The repeater is configured to send an excitation signal to the target tag based on the first signal. The target tag is configured to send a target backscatter signal based on excitation of the excitation signal, where the target backscatter signal carries electronic product code information. The reader is further configured to: receive the target backscatter signal, and obtain the electronic product code information in the target backscatter signal.

It may be learned from the foregoing description that, in this embodiment of this application, the reader first sends the first signal to the repeater, and the repeater then sends the excitation signal to the target tag based on the first signal. Compared with the prior art in which the reader directly sends the excitation signal to the target tag, a communication distance between the reader and the target tag can be increased. In addition, because in an original radio frequency identification system, the entire system has only one reader and a tag, the reader needs to send the excitation signal to the tag and receive a backscatter signal sent by the tag. Because the entire radio frequency identification system is full-duplex, the excitation signal may be sent while the backscatter signal is received at the same time. The excitation signal and the backscatter signal interfere with each other. Consequently, the reader has relatively low sensitivity of receiving the backscatter signal. However, in the radio frequency identification system provided in this application, the reader no longer sends the excitation signal, but the repeater sends the excitation signal, so that the reader no longer sends the excitation signal while receiving the backscatter signal at the same time, and the backscatter signal is no longer interfered with by the excitation signal, thereby improving sensitivity of receiving the backscatter signal by the reader.

In a possible design, the first signal carries an excitation parameter, and a specific implementation process in which the repeater sends the excitation signal to the target tag based on the first signal may be: obtaining, by the repeater, the excitation parameter from the first signal; generating, by the repeater, the excitation signal based on the excitation parameter; and sending, by the repeater, the excitation signal to the target tag.

It may be learned from the foregoing description that, in this embodiment of this application, the reader may control information such as power and a phase of the excitation signal sent by the repeater, so that the reader controls the repeater.

In a possible design, when sending the excitation signal to the target tag based on the first signal, the repeater is specifically configured to: receive the first signal sent by the reader; and send the first signal to the target tag, where the first signal is the excitation signal.

It may be learned from the foregoing description that, in this embodiment of this application, the repeater does not need to perform parsing processing on the excitation signal sent by the reader, and directly forwards the excitation signal through conversion, so that the repeater has a simple function and relatively low power consumption, and is particularly applicable to a mobile scenario.

In a possible design, the repeater receives, at a first frequency, the first signal sent by the reader; and the repeater sends the excitation signal to the target tag at a second frequency.

In a possible design, a specific implementation process in which the target tag sends the backscatter signal based on the excitation of the excitation signal may be directly sending the target backscatter signal to the reader based on the excitation of the excitation signal; or may be sending the target backscatter signal to the repeater based on the excitation of the excitation signal. The repeater is further configured to send the target backscatter signal to the reader.

In a possible design, the system further includes a reference tag. The repeater is further configured to send the excitation signal to the reference tag based on the first signal. The reference tag is configured to send a reference backscatter signal based on the excitation signal. The reader is further configured to: determine, based on the reference backscatter signal and the target backscatter signal, a location relationship between the reference tag and the target tag; and determine, based on the location relationship between the reference tag and the target tag and location information of the reference tag, location information of the target tag.

It may be learned from the foregoing description that, in this embodiment of this application, the target tag can be accurately positioned in the foregoing manner in which the reference tag is used.

According to a second aspect, a method for constructing a relay network is provided. The relay network includes a reader and at least one repeater. The method includes: receiving, by the reader, identification information reported by the repeater, where the identification information is used to uniquely identify the repeater; determining, by the reader based on the identification information reported by the repeater, whether the repeater is legal; and sending, by the reader, first information to the repeater when determining that the repeater is legal, where the first information is used to notify the repeater to connect to the relay network.

In a possible design, before the receiving, by the reader, identification information reported by the repeater, the method further includes: sending, by the reader, second information, where the second information is used to notify the repeater to report the identification information.

In a possible design, after the sending, by the reader, first information to the repeater, the method further includes: sending, by the reader, third information to the repeater, where the third information is used to notify the repeater to start synchronization; receiving, by the reader, fourth information sent by the repeater, where the fourth information is used for synchronization adjustment between the reader and the repeater; calculating, by the reader, a synchronization adjustment offset between the reader and the repeater based on the fourth information; and sending, by the reader, fifth information to the repeater, where the fifth information carries the synchronization adjustment offset between the reader and the repeater, and the fifth information is used by the repeater to perform the synchronization adjustment, to maintain synchronization with the reader.

In a possible design, when the relay network includes a plurality of repeaters, the method further includes: scheduling, by the reader in a manner such as a frequency division multiple access manner, a time division multiple access manner, or a code division multiple access manner, the plurality of repeaters to send an excitation signal to a target tag, where the excitation signal is used to excite the target tag to send a backscatter signal.

According to a third aspect, a method for constructing a relay network is provided. The relay network includes a reader and at least one repeater. The method includes: obtaining, by the repeater, identification information of the repeater, where the identification information is used to uniquely identify the repeater; and reporting, by the repeater, the identification information.

In a possible design, before the reporting, by the repeater, the identification information, the method further includes: receiving, by the repeater, second information sent by the reader, where the second information is used to notify the repeater to report the identification information.

In a possible design, the method further includes: receiving, by the repeater, third information sent by the reader, where the third information is used to notify the repeater to start synchronization; sending, by the repeater, fourth information, where the fourth information is used for synchronization adjustment between the reader and the repeater; receiving, by the repeater, fifth information sent by the reader, where the fifth information carries a synchronization adjustment offset between the reader and the repeater; and maintaining, by the repeater, synchronization with the reader based on the synchronization adjustment offset carried in the fifth information.

According to a fourth aspect, this application provides a reader in a relay network. The relay network further includes at least one repeater. The reader is configured to execute units or means of the steps in the second aspect.

According to a fifth aspect, this application provides a repeater in a relay network. The relay network further includes a reader. The repeater is configured to execute units or means of the steps in the third aspect.

According to a sixth aspect, a reader in a relay network is provided. The reader includes a processor and a memory. The memory stores a computer program instruction. The processor is configured to execute the computer program instruction stored in the memory, to perform the method according to the second aspect.

According to a seventh aspect, a repeater in a relay network is provided. The repeater includes a processor and a memory. The memory stores a computer program instruction. The processor is configured to execute the computer program instruction stored in the memory, to perform the method according to the third aspect.

According to an eighth aspect, a computer-readable storage medium is provided. The computer-readable storage medium stores an instruction. When the instruction is run on a computer, the computer is enabled to perform the method according to the second aspect or the third aspect.

It may be learned from the foregoing description that, in the embodiments of this application, the reader first sends the first signal to the repeater, and the repeater then sends the excitation signal to the target tag based on the first signal. Compared with the prior art in which the reader directly sends the excitation signal to the target tag, a communication distance between the reader and the target tag can be increased.

DESCRIPTION OF EMBODIMENTS

Figure 1:
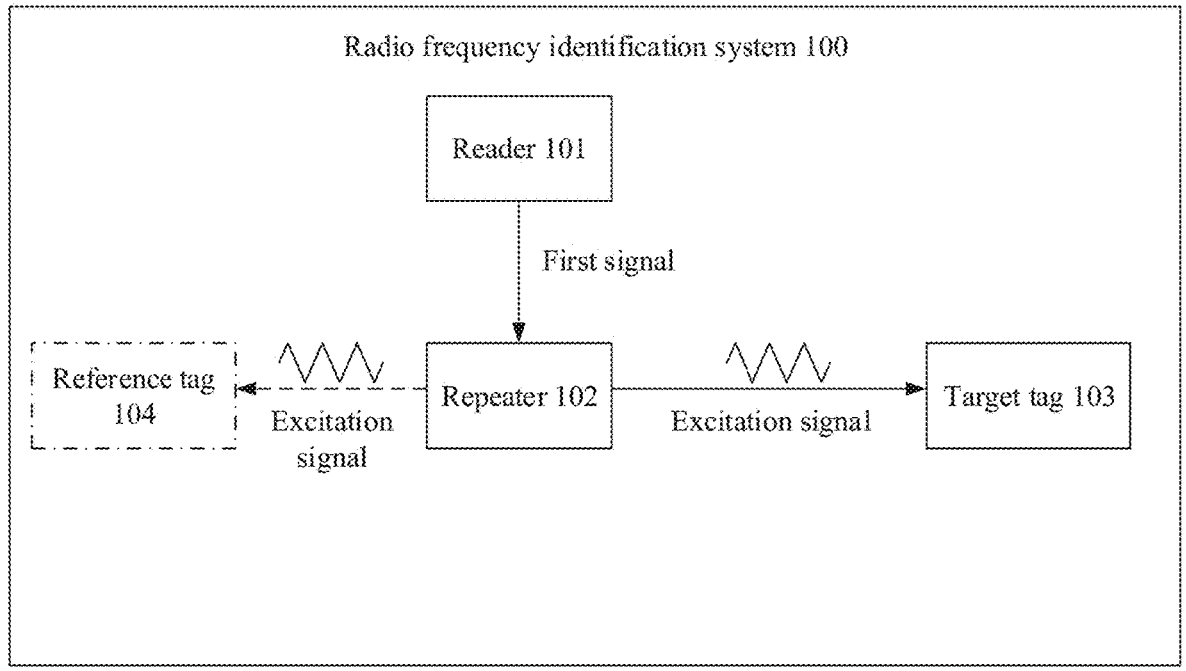
FIG. 1 to FIG. 5 are schematic diagrams of a radio frequency identification system according to an embodiment of this application.

As shown in FIG. 1, an embodiment of this application provides a radio frequency identification system 100. The radio frequency identification system 100 includes a reader 101, a repeater 102, and a target tag 103.

The reader 101 is configured to send a first signal to the repeater 102.

The repeater 102 is configured to send an excitation signal to the target tag 103 based on the first signal.

The target tag 103 is configured to send a target backscatter signal based on the excitation of the excitation signal, where the target backscatter signal carries electronic product code (EPC) information.

Figure 2:
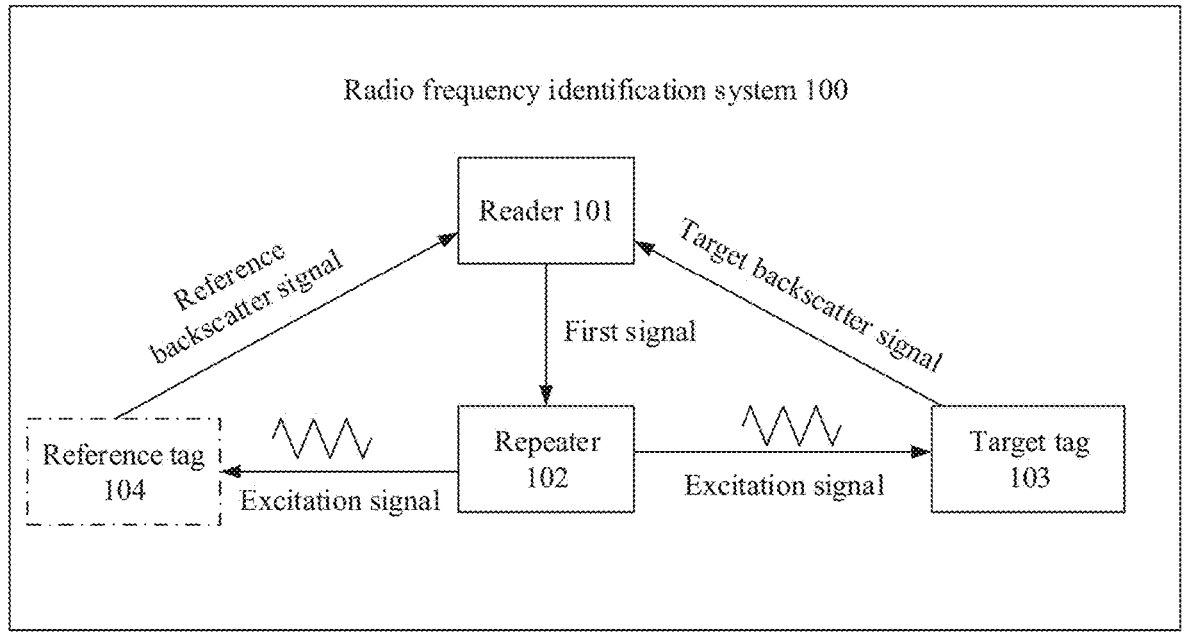

In an example of this application, as shown in FIG. 2, the target tag 103 may directly send the target backscatter signal to the reader 101.

Figure 3:
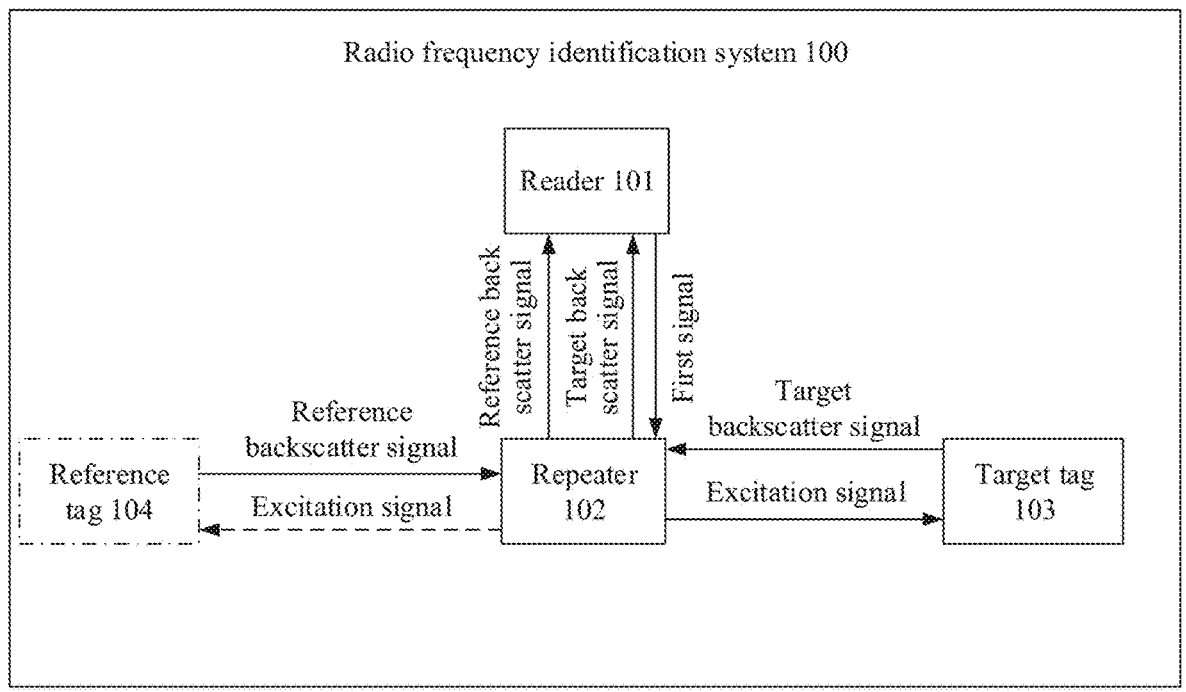

In another example of this application, as shown in FIG. 3, the target tag 103 may send the target backscatter signal to the repeater 102, and the repeater 102 may forward the target backscatter signal to the reader 101.

The reader 101 is further configured to: receive the target backscatter signal, and obtain the EPC information in the target backscatter signal.

In this embodiment of this application, the EPC information may be stored on the target tag 103. The EPC information is next-generation product identification code, and may globally uniquely identify an object (for example, an article, a cargo tank, a pallet, or a location) in a supply chain.

In this embodiment of this application, the reader 101 may also be referred to as a receiver or the like. A function of the reader 101 may alternatively be implemented by a baseband unit (radio remote unit, RRU) in a base station, and the reader 101 may also be referred to as the RRU. A function of the reader 101 may alternatively be implemented by a wireless local area network wireless access point (WLAN AP), and the reader 101 may also be referred to as the WLAN AP. The repeater 102 may also be referred to as an exciter, a helper, or the like. The target tag is merely for ease of description and is distinguished from the following reference tag. The target tag and the reference tag are actually only one tag, and the words "target" and "reference" have no other meanings. Similarly, the target backscatter signal is merely for ease of description and is distinguished from the following reference backscatter signal. Both the target backscatter signal and the reference backscatter signal are actually backscatter signals, and the words "target" and "reference" have no other meanings.

In this embodiment of this application, the following two manners in which the repeater 102 sends the excitation signal to the target tag 103 based on the first signal sent by the reader 101 may be specifically provided.

Manner 1: The reader 101 may add an excitation parameter to the first signal. When receiving the first signal, the repeater 102 may obtain the excitation parameter in the first signal, then generate the excitation signal based on the excitation parameter, and finally, send the excitation signal to the target tag 103.

It may be learned from the foregoing Manner 1 that the reader 101 may control, by adding the excitation parameter to the first signal, the repeater 102 to send the excitation signal. For example, if the first signal carries a parameter such as power, the reader 101 may control the repeater 102 to send the power of the excitation signal. Further, the target tag 103 may alternatively be positioned by controlling the repeater 102 to send the excitation signal.

Manner 2: The first signal may directly be the excitation signal, to be specific, the reader 101 may directly send the excitation signal to the repeater 102, and the repeater 102 may directly forward the excitation signal to the target tag 103, thereby achieving an objective of being simple, convenient, and quick.

It may be learned from the foregoing Manner 2 that the repeater 102 directly forwards the excitation signal sent by the reader 101 and does not perform any processing, so that the repeater 102 has a simple function and relatively low power, and is very applicable to a mobile scenario.

It may be learned from the foregoing description that, in this embodiment of this application, the reader 101 first sends the first signal to the repeater 102, and the repeater 102 then sends the excitation signal to the target tag 103 based on the first signal. Compared with the prior art in which the reader 101 directly sends the excitation signal to the target tag 103, a communication distance between the reader 101 and the target tag 103 can be increased.

In addition, because in an original radio frequency identification system, the entire system has only one reader and a tag, the reader needs to send the excitation signal to the tag and receive the backscatter signal sent by the tag. Because the entire radio frequency identification system is full-duplex, the excitation signal may be sent while the backscatter signal is received at the same time. The excitation signal and the backscatter signal interfere with each other. Consequently, the reader has relatively low sensitivity of receiving the backscatter signal. However, in the radio frequency identification system 100 provided in this application, the reader 101 no longer directly sends the excitation signal to the tag, but the repeater 102 sends the excitation signal to the target tag 103 based on control of the reader 101 so that the reader 101 no longer sends the excitation signal while receiving the backscatter signal at the same time, and the backscatter signal is no longer interfered with by the excitation signal, thereby improving sensitivity of receiving the backscatter signal by the reader 101.

Optionally, as shown in FIG. 1, FIG. 2, or FIG. 3, the radio frequency identification system 100 may further include a reference tag 104.

The repeater 102 is further configured to send the excitation signal to the reference tag 104 based on the first signal sent by the reader 101.

For a manner in which the repeater 102 sends the excitation signal to the reference tag 104 based on the first signal, refer to the foregoing manner in which the repeater 102 sends the excitation signal to the target tag 103 based on the first signal. Details are not described herein again.

The reference tag 104 is further configured to send the reference backscatter signal based on the excitation signal.

In this embodiment of this application, as shown in FIG. 2, the reference tag 104 may directly send the reference backscatter signal to the reader 101. Alternatively, as shown in FIG. 3, the reference tag 104 may send the reference backscatter signal to the repeater 102, and the repeater 102 forwards the reference backscatter signal to the reader 101.

The reader 101 is further configured to: determine, based on the target backscatter signal sent by the target tag 103 and the reference backscatter signal sent by the reference tag 104, a location relationship between the reference tag 104 and the target tag 103; and determine, based on the location relationship between the reference tag 104 and the target tag 103 and preset location information of the reference tag 104, location information of the target tag 103.

In this embodiment of this application, the reference tag 104 may be preset at a location, and then the location information of the reference tag 104 is notified to the reader 101. When receiving the reference backscatter signal sent by the reference tag 104 and the target backscatter signal sent by the target tag 103, the reader 101 may determine, based on phase information, power information, and the like of the reference backscatter signal and the target backscatter signal, the location relationship between the reference tag 104 and the target tag 103. Finally, the reader 101 determines the location information of the target tag 103 based on the location information of the reference tag 104. For example, if the preset location information of the reference tag 104 is 39 degrees north latitude and 116 degrees east longitude, and the location relationship between the reference tag 104 and the target tag 103 obtained by the reader 101 is a difference between the location information of the reference tag 104 and the location information of the target tag 103, that is, 0.001 degree latitude and same longitude, the reader 101 may determine that the location information of the target tag 103 is 39.001 degrees north latitude and 116 degrees east longitude.

It may be learned from the foregoing description that, in this embodiment of this application, positioning accuracy of the target tag can be improved in the foregoing positioning manner.

In this embodiment of this application, as shown in FIG. 2, a process in this application is described in detail by using an example in which the target tag 103 directly sends the target backscatter signal to the reader 101.

As shown in FIG. 2, in this embodiment of this application, the reader 101 may send the first signal to the repeater 102 at a first frequency. Correspondingly, the repeater 102 receives the first signal at the first frequency. Then, the repeater 102 may generate the excitation signal based on the first signal. Finally, the repeater 102 may send the excitation signal to the target tag 103 at a second frequency. The target tag 103 sends the target backscatter signal to the reader 101 based on the excitation of the excitation signal.

It may be learned from the foregoing description that the repeater 102 receives the first signal at the first frequency, and then sends the excitation signal at the second frequency, where the first frequency may be the same as or different from the second frequency. For example, the first frequency may be a frequency on a licensed frequency band, and the second frequency may be a frequency on an unlicensed frequency band.

In this embodiment of this application, there may specifically be two manners in which the repeater 102 sends the excitation signal. Manner 1: The repeater 102 receives, at the first frequency, the first signal sent by the reader 101, then obtains the excitation parameter carried in the first signal, generates the excitation signal based on the excitation parameter, and finally sends the excitation signal to the target tag 103 at the second frequency. In this manner, the reader 101 may control information such as power and a phase of the excitation signal sent by the repeater 102. Manner 2: The first signal sent by the reader 101 is directly the excitation signal. When receiving the excitation signal at the first frequency, the repeater 102 directly forwards the excitation signal to the target tag 103 at the second frequency. In this manner, when receiving the excitation signal, the repeater 102 directly forwards the excitation signal through conversion and does not need to perform parsing processing on the excitation signal, so that the repeater 102 has relatively low power consumption, and is applicable to a mobile scenario.

Optionally, as shown in FIG. 2, the radio frequency identification system 100 may further include the reference tag 104. After receiving, at the first frequency, the first signal sent by the reader 101, the repeater 102 may alternatively send the excitation signal to the reference tag 104 at the second frequency. The reference tag 104 may send the reference backscatter signal to the reader 101 based on the excitation of the excitation signal. Certainly, the first frequency may be the same as or different from the second frequency.

In the embodiment shown in FIG. 2, the reader 101 may determine the location information of the target tag by using the target backscatter signal sent by the target tag 103 and the reference backscatter signal sent by the reference tag 104, thereby positioning the target tag more accurately.

In this embodiment of this application, as shown in FIG. 3, a process in this application is described in detail by using an example in which the target tag 103 sends the target backscatter signal to the repeater 102, and the repeater 102 forwards the target backscatter signal to the reader 101.

In this embodiment of this application, the reader 101 may send the first signal to the repeater 102 at a first frequency. Correspondingly, the repeater 102 may receive the first signal at the first frequency. Then, the repeater 102 may generate the excitation signal based on the first signal, and then send the excitation signal to the target tag 103 at a second frequency. The target tag 103 sends the target backscatter signal to the repeater 102 at the second frequency. The repeater 102 sends the target backscatter signal to the reader 101 at the first frequency.

Optionally, as shown in FIG. 3, the radio frequency identification system 100 may further include the reference tag 104. After receiving the first signal sent by the reader 101 at the first frequency, the repeater 102 may send the excitation signal to the reference tag 104 at the second frequency. After receiving the excitation signal, the reference tag 104 may send the reference backscatter signal to the repeater 102 under the excitation of the excitation signal. The repeater 102 may forward the reference backscatter signal to the reader 101.

Similarly, in the embodiment shown in FIG. 3, the reader 101 may determine the location information of the target tag by using the target backscatter signal sent by the target tag 103 and the reference backscatter signal sent by the reference tag 104, thereby positioning the target tag more accurately.

Figure 4:
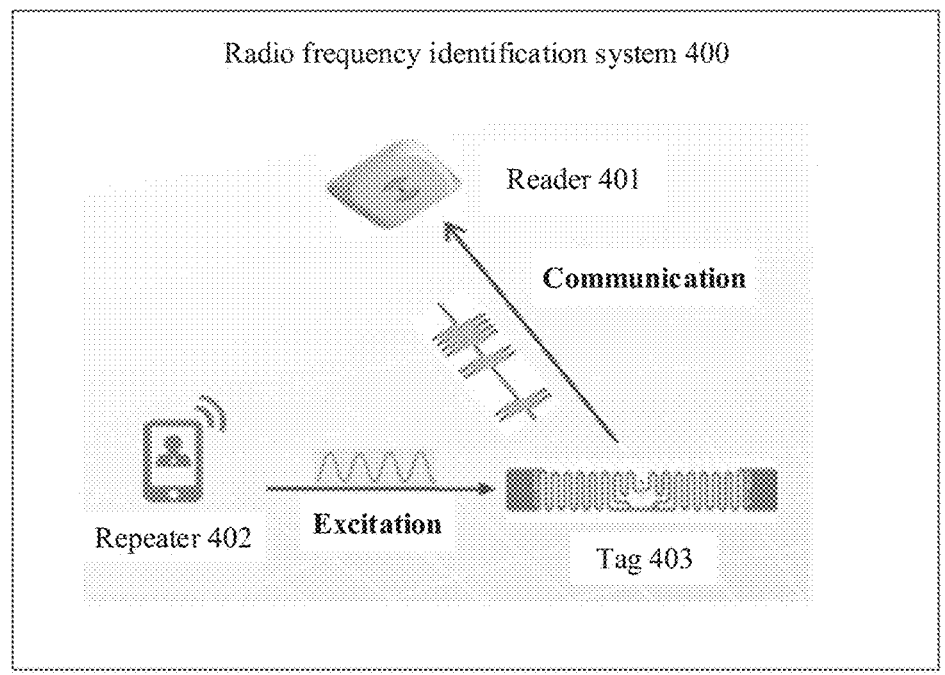

For the embodiment shown in FIG. 2, as shown in FIG. 4, this application provides a radio frequency identification system 400. In the radio frequency identification system 400, a working process is described in detail by using an example in which the reader 101 and the WLAN AP shown in FIG. 2 are co-sited, or a function of the reader 101 is integrated into the WLAN AP, or the reader 101 is integrated into the WLAN AP the repeater 102 is an intelligent terminal, and the target tag is a tag.

As shown in FIG. 4, the radio frequency identification system 400 includes a reader 401, a repeater 402, and a tag 403.

The reader 401 may send a control signal to a terminal device (that is, the repeater 402). The control signal may correspond to the first signal shown in FIG. 2.

After receiving the control signal, the repeater 402 may send an excitation signal to the tag 403.

After receiving the excitation signal, the tag 403 may send a backscatter signal to the reader 401, where the backscatter signal carries EPC information of the tag.

In this embodiment of this application, the tag 403 may specifically be a commercial passive radio frequency identification tag.

The radio frequency identification system 400 shown in FIG. 4 has the following advantages: (1) Because the repeater 402 has a simple function and excessively low power consumption, the repeater 402 can be applicable to a mobile scenario. (2) The receiver sensitivity of the reader 401 is improved, a communication distance between the reader 401 and the passive radio frequency identification tag can be improved, the WLAN AP and the reader 401 are co-sited, and construction costs of a customer is reduced. (3) The receiver sensitivity of the reader 401 is improved, and the reliability of inventory of the tag can be improved. (4) The tag 403 can be positioned in a high precision manner. (5) The tag 403 is excited and backscattered only when there is an excitation signal, and the reader 401 may control the repeater to determine whether to perform backscattering.

However, the repeater 402 has a limited excitation range. Therefore, high-precision positioning can be implemented.

Figure 5:
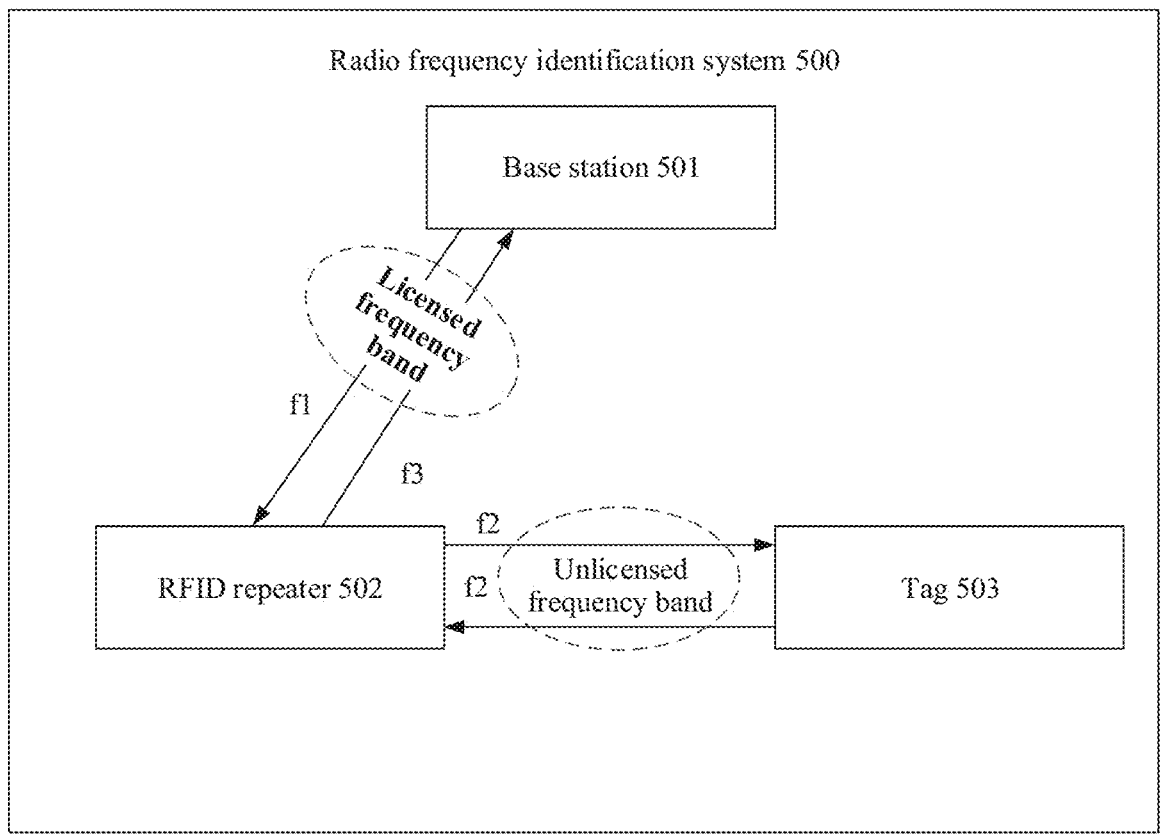

For the foregoing embodiment shown in FIG. 3, as shown in FIG. 5, this application provides a radio frequency identification system 500. In the radio frequency identification system 500, a working process is described in detail by using an example in which the reader 101 and the base station shown in FIG. 3 are co-sited, or a function of the reader 101 is integrated into the base station, or the reader 101 is integrated into the base station, the repeater 102 is a radio frequency identification (RFID) repeater, and the target tag is a tag.

As shown in FIG. 5, the radio frequency identification system 500 includes a base station 501, an RFID repeater 502, and a tag 503.

The base station 501 may send an excitation signal to the RFID repeater 502 on a downlink frequency band f1 of a licensed frequency band.

After receiving the excitation signal, the RFID repeater 502 forwards the excitation signal to the tag 503 on a frequency band f2 of an unlicensed frequency band.

The tag 503 may send, under excitation of the excitation signal, a backscatter signal to the RFID repeater 502 on the frequency band f2 of the unlicensed frequency band. The tag 503 may specifically be a commercial passive RFID tag.

After receiving the backscatter signal, the RFID repeater 502 may forward the backscatter signal to the base station 501 on an uplink frequency band f3 of the licensed frequency band.

The base station 501 receives the backscatter signal on the uplink frequency band 3 of the licensed frequency band and obtains EPC information in the backscatter signal.

In the radio frequency identification system shown in FIG. 5, the base station 501 communicates with the RFID repeater 502 by using the licensed frequency band and controls the RFID repeater 502 to start inventory of the tag 503. The RFID repeater 502 does not parse an analog signal sent by the base station 501, and directly forwards the analog signal to the tag 503 through radio frequency conversion. The tag 503 sends the backscatter signal to the RFID repeater 502. The RFID repeater 502 forwards the backscatter signal to the base station 501 through conversion. The base station 501 receives the backscatter signal and parses commercial RFID tag data, to obtain EPC information of the commercial RFID tag data.

The radio frequency identification system 500 shown in FIG. 5 has the following advantages: (1) A communication distance between the base station and the tag is increased so that a macro base station can support an RFID service. (2) The RFID repeater 502 directly forwards a radio frequency signal through conversion, so that the RFID repeater has a simple function, high cost-effectiveness, and real-time data transmission. (3) The simple function, the high cost-effectiveness, and the real-time data transmission can be implemented.

Based on any one of the radio frequency identification systems provided in FIG. 1 to FIG. 5, this application provides a method for constructing a relay network. Constructing the relay network refers to constructing a communications network between a reader and a repeater. A process of constructing the relay network may include: (1) The reader authenticates the repeater. (2) The reader performs synchronization with the repeater. (3) The reader schedules the repeater. A process in which the reader schedules the repeater may be: sending, by the reader, the first signal or the control signal to the repeater, so that the repeater sends an excitation signal to a tag based on the first signal or the control signal.

Figure 6:
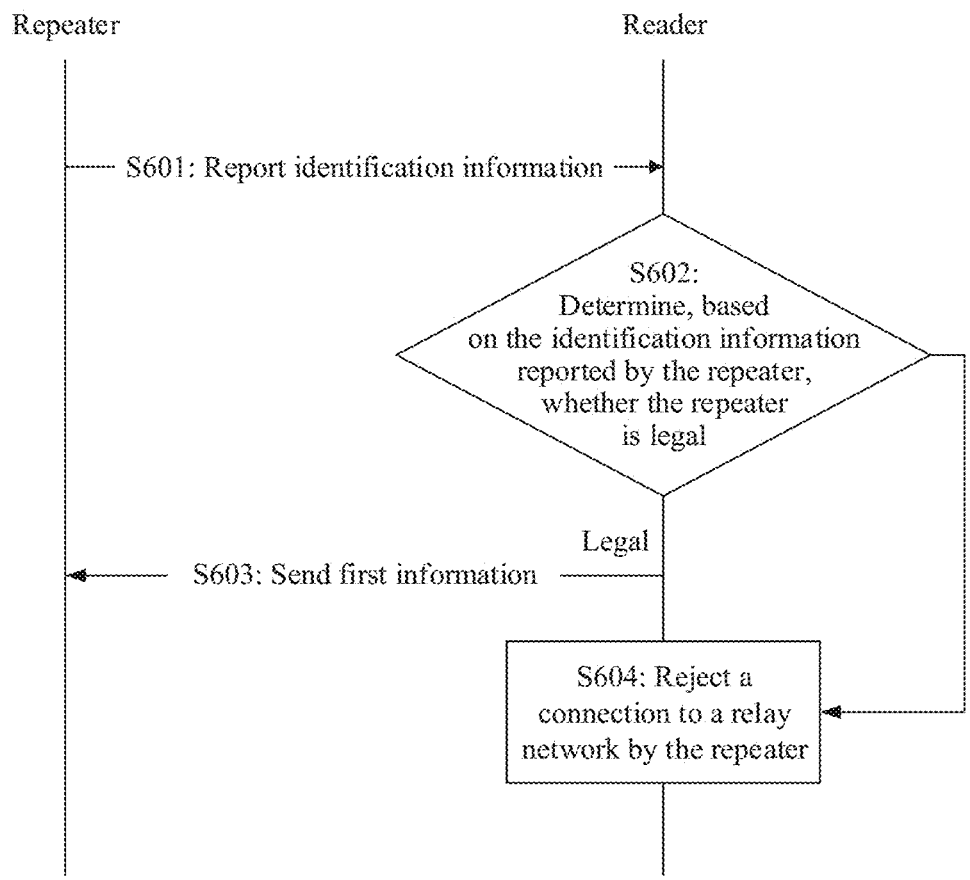
FIG. 6 to FIG. 9 are flowcharts of a repeater authentication method according to an embodiment of this application.

Specifically, as shown in FIG. 6, a process in which the reader authenticates the repeater is first described.

Step S601: The repeater reports identification information, where the identification information is used to uniquely identify the repeater.

Step S602: The reader determines, based on the identification information reported by the repeater, whether the repeater is legal. If the repeater is legal, step S603 is performed; or if the repeater is not legal, step S604 is performed.

Step S603: The reader sends first information to the repeater, where the first information is used to notify the repeater to connect to the relay network.

Step S604: The reader rejects a connection to the relay network by the repeater.

Optionally, in the procedure shown in FIG. 6, before step S601, the method further includes: sending, by the reader, second information, where the second information is used to notify the repeater to report the identification information.

With reference to the procedure shown in FIG. 6, this application provides the following three procedures in which the reader authenticates the repeater. The following specifically describes the procedures.

Figure 7:
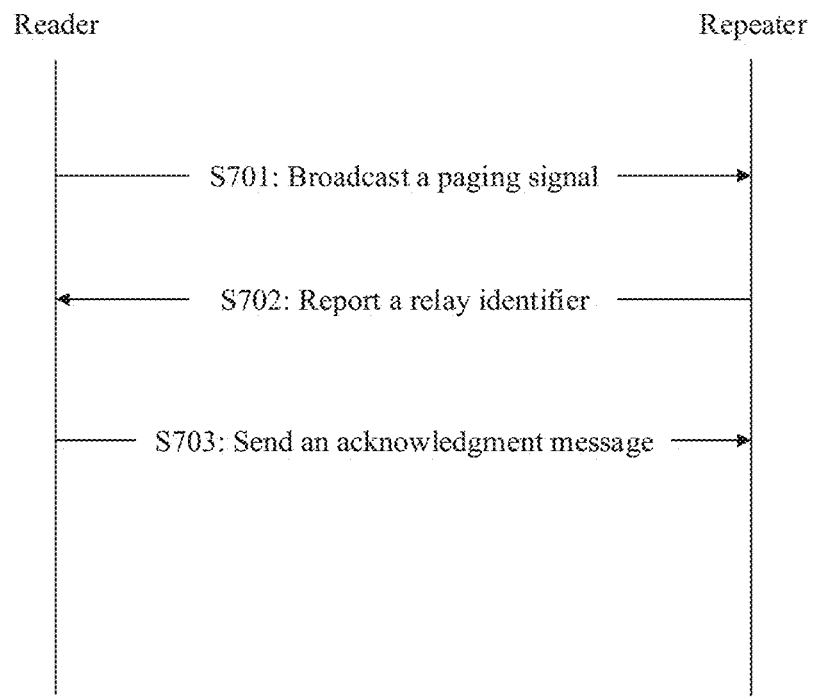

Procedure 1 is shown in FIG. 7.

Step S701: The reader broadcasts a paging signal.

Step S702: After receiving the paging signal, the repeater reports a relay identifier to the reader.

Step S703: The reader sends an acknowledgment message, where the acknowledgment message is used to determine that the reader has received the identification information reported by the repeater and legality authentication succeeds.

Figure 8:
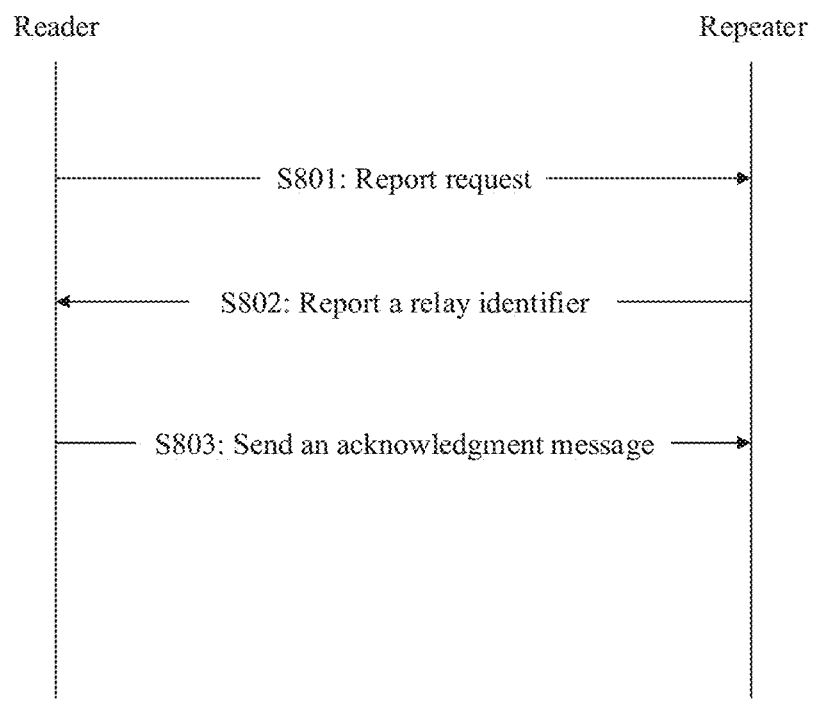

Procedure 2 is shown in FIG. 8.

Step S801: The reader sends a report request to the repeater.

Step S802: After receiving the report request, the repeater reports a relay identifier to the reader.

Step S803: The reader sends an acknowledgment message, where the acknowledgment message is used to determine that the reader has received the identification information reported by the repeater and legality authentication succeeds.

Figure 9:
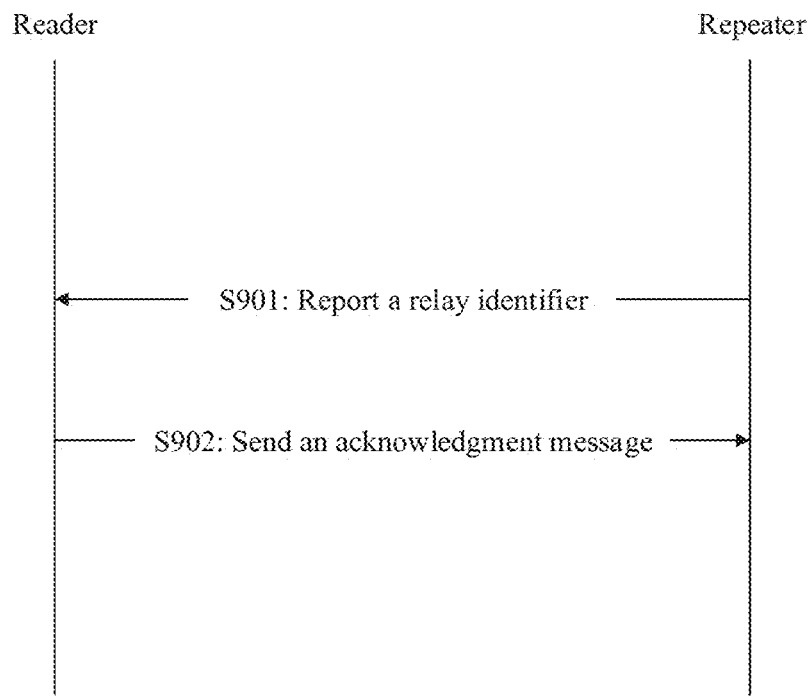

Procedure 3 is shown in FIG. 9.

Step S901: The repeater reports the identification information.

Step S902: The reader sends an acknowledgment message, where the acknowledgment message is used to determine that the reader has received the identification information reported by the repeater and legality authentication succeeds.

It should be noted that, in this embodiment of this application, the entire relay network includes one reader and one or more repeaters. When the entire relay network includes a plurality of repeaters, the reader needs to authenticate the repeaters in order. In this embodiment of this application, the reader may start a subsequent service procedure (for example, synchronization or scheduling) after completing authentication on all repeaters, or may start a subsequent service procedure for each repeater after completing authentication on the repeater.

Figure 10:
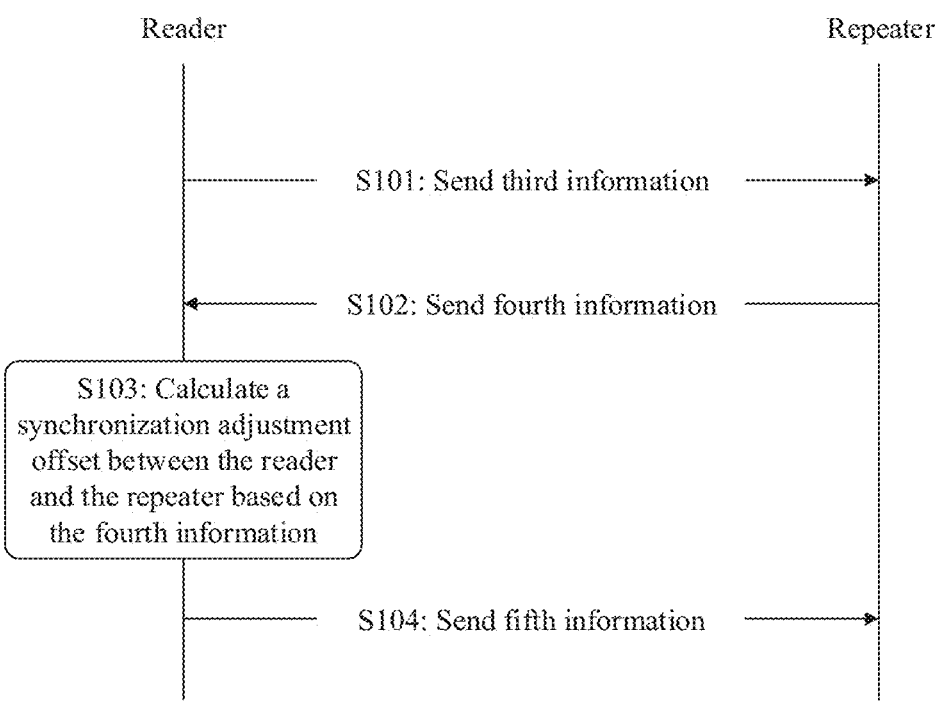
FIG. 10 and FIG. 11 are flowcharts of synchronization adjustment between a reader and a repeater according to an embodiment of this application.

A process in which the reader performs synchronization with the repeater is then described. As shown in FIG. 10, a procedure in which the reader performs synchronization with the repeater includes the following steps.

Step S101: The reader sends third information to the repeater, where the third information is used to notify the repeater to start synchronization.

Step S102: The repeater sends fourth information to the reader, where the fourth information is used for synchronization adjustment between the reader and the repeater.

Step S103: The reader calculates a synchronization adjustment offset between the reader and the repeater based on the fourth information.

Step S104: The reader sends fifth information to the repeater, where the fifth information carries the synchronization adjustment offset between the reader and the repeater, and the fifth information is used by the repeater to perform the synchronization adjustment, to maintain synchronization with the reader.

In this embodiment of this application, because the reader and the repeater are asynchronous systems, the method shown in FIG. 10 may be used to maintain synchronization between the reader and the repeater.

Figure 11:
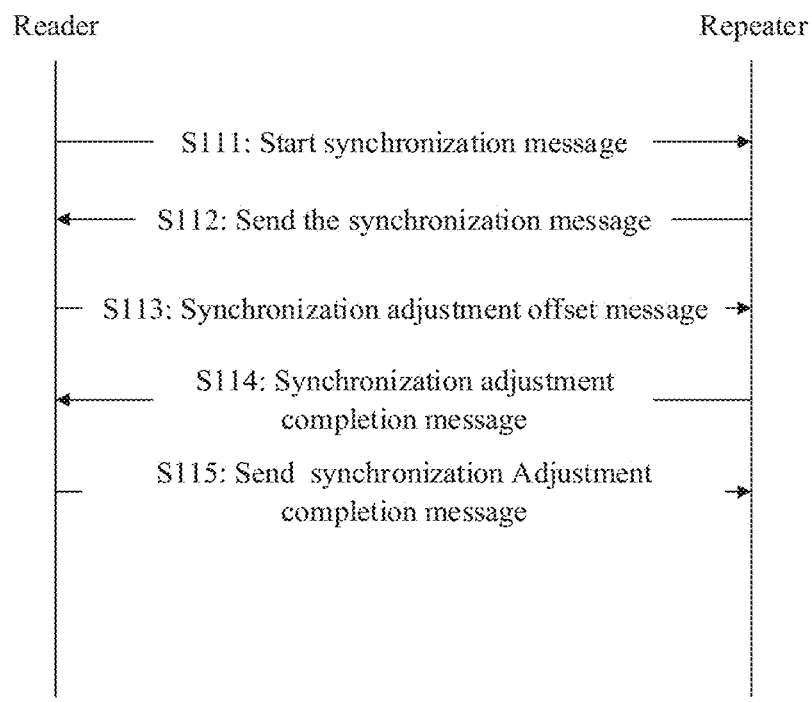

For the synchronization procedure shown in FIG. 10, as shown in FIG. 11, this application specifically provides a synchronization procedure between the reader and the repeater. The procedure includes the following steps.

Step S111: The reader sends a synchronization message to the repeater.

Step S112: The repeater sends the synchronization message to the reader.

Step S113: The reader sends a synchronization adjustment offset message.

Step S114: The repeater completes synchronization between the repeater and the reader based on the synchronization adjustment offset message, and sends a synchronization adjustment completion message to the reader.

Step S115: The reader sends a synchronization adjustment completion message to the repeater.

In this embodiment of this application, synchronization between the reader and the repeater may be maintained by performing the foregoing step S11 to step S115.

A manner in which the reader schedules the repeater is finally described.

It may be learned from the foregoing description that, in this embodiment of this application, the entire relay network may include one reader and at least one repeater. When the entire relay network includes a plurality of repeaters, the reader may schedule, in a manner such as a frequency division multiple access manner, a time division multiple access manner, or a code division multiple access manner, the repeaters to send an excitation signal to a target tag or a reference tag.

Figure 12:
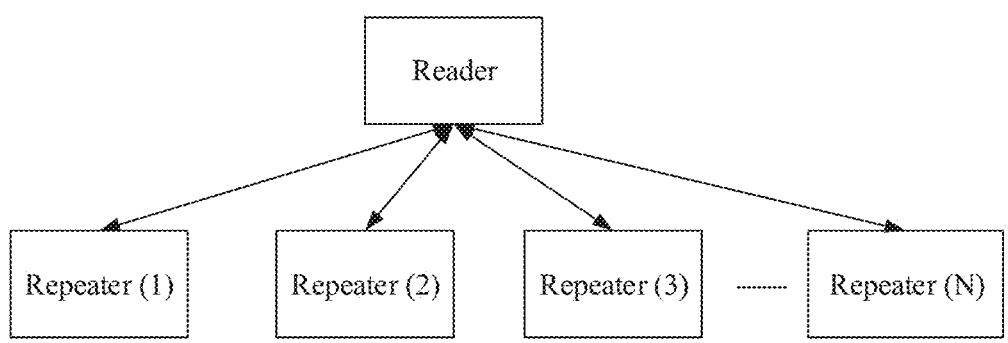
FIG. 12 is a schematic diagram of a scheduling combination of a reader and a repeater according to an embodiment of this application.

In this embodiment of this application, as shown in FIG. 12, it is assumed that the entire relay network includes one reader and N repeaters. The N repeaters are respectively a repeater (1), a repeater (2), a repeater (3), . . . , and a repeater (N). The reader may schedule the repeater to send the excitation signal in the following manners.

(1) Time division multiple access manner: The reader sequentially schedules the repeater (1), the repeater (2), the repeater (3), . . . , and the repeater (N) in chronological order, so that each repeater sends an excitation signal to a corresponding tag.

(2) Frequency division multiple access manner: The reader allocates different frequencies to each repeater. The repeater interacts with the reader at the frequency allocated to the repeater. The reader receives and parses tag backscatter signals excited by the plurality of repeaters.

(3) Code division multiple access manner: The reader may simultaneously schedule the plurality of repeaters at the same frequency. Each repeater parses, based on an ID of the repeater, a message sent by the reader to the repeater, and excites a tag backscatter signal, that is, when simultaneously performing communication interaction with the reader at the same frequency, different repeaters are distinguished by using IDs of the repeaters as code words. The reader receives and parses the tag backscatter signals excited by the plurality of repeaters.

(4) Space division multiple access manner: The reader schedules the plurality of repeaters through space division. The space division includes but is not limited to an MU-BF technology.

It may be learned from the foregoing description that, in this embodiment of this application, when the entire relay network includes the plurality of repeaters, the reader may schedule the repeaters in different manners, so that it is ensured that the plurality of repeaters work collaboratively.

Figure 13:
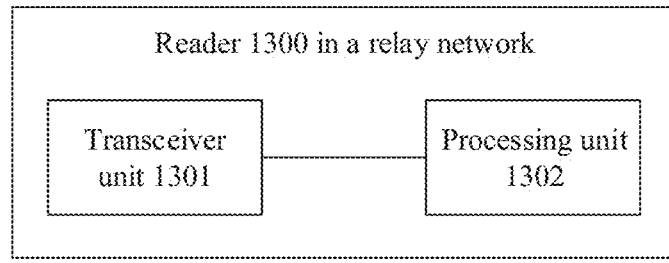
FIG. 13 and FIG. 15 are schematic structural diagrams of a reader in a relay network according to an embodiment of this application.

Based on the foregoing concept, as shown in FIG. 13, this application further discloses a reader 1300 in a relay network. The relay network further includes at least one repeater. The reader 1300 in the relay network includes: a transceiver unit 1301, configured to receive identification information reported by the repeater, where the identification information is used to uniquely identify the repeater; and a processing unit 1302, configured to determine, based on the identification information reported by the repeater, whether the repeater is legal.

The transceiver unit 1301 is further configured to send first information to the repeater when determining that the repeater is legal, where the first information is used to notify the repeater to connect to the relay network.

Optionally, the transceiver unit 1301 is further configured to send second information before receiving the identification information reported by the repeater, where the second information is used to notify the repeater to report the identification information.

In a specific example, the transceiver unit 1301 is further configured to: send third information to the repeater, where the third information is used to notify the repeater to start synchronization; and receive fourth information sent by the repeater, where the fourth information is used for synchronization adjustment between the reader and the repeater. The processing unit 1302 is further configured to calculate a synchronization adjustment offset between the reader and the repeater based on the fourth information. The transceiver unit 1301 is further configured to send fifth information to the repeater, where the fifth information carries the synchronization adjustment offset between the reader and the repeater, and the fifth information is used by the repeater to perform the synchronization adjustment, to maintain synchronization with the reader.

In another example of this application, when the relay network includes a plurality of repeaters, the processing unit 1302 is further configured to schedule, in a manner such as a frequency division multiple access manner, a time division multiple access manner, or a code division multiple access manner, the plurality of repeaters to send an excitation signal to a target tag, where the excitation signal is used to excite the target tag to send a backscatter signal.

Figure 14:
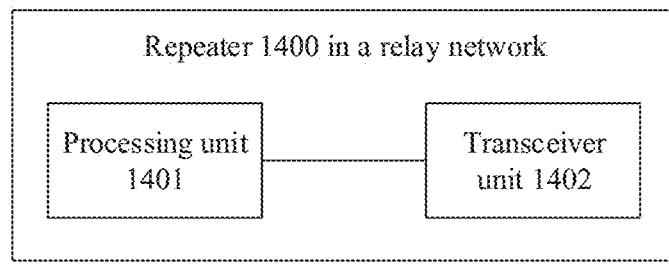
FIG. 14 and FIG. 16 are schematic structural diagrams of a repeater in a relay network according to an embodiment of this application.

Based on the foregoing concept, still referring to FIG. 14, this application further discloses a repeater 1400 in a relay network. The relay network further includes a reader. The repeater 1400 in the relay network includes:

a processing unit 1401, configured to obtain identification information of the repeater, where the identification information is used to uniquely identify the repeater; and a transceiver unit 1402, configured to report the identification information.

Optionally, the transceiver unit 1402 is further configured to receive, before reporting the identification information, second information sent by the reader, where the second information is used to notify the repeater to report the identification information.

Optionally, the transceiver unit 1402 is further configured to: receive third information sent by the reader, where the third information is used to notify the repeater to start synchronization; send fourth information, where the fourth information is used for synchronization adjustment between the reader and the repeater; and receive fifth information sent by the reader, where the fifth information carries a synchronization adjustment offset between the reader and the repeater. The processing unit 1401 is further configured to maintain synchronization with the reader based on the synchronization adjustment offset carried in the fifth information.

Figure 15:
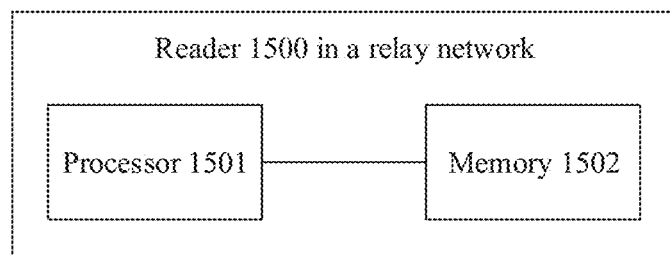

Based on the foregoing concept, as shown in FIG. 15, this application further discloses a reader 1500 in a relay network. The reader 1500 includes a processor 1501 and a memory 1502.

The memory 1502 stores a computer program instruction.

The processor 1501 is configured to execute the computer program instruction stored in the memory, to perform the steps performed by a reader side in the foregoing method for constructing a relay network.

Figure 16:
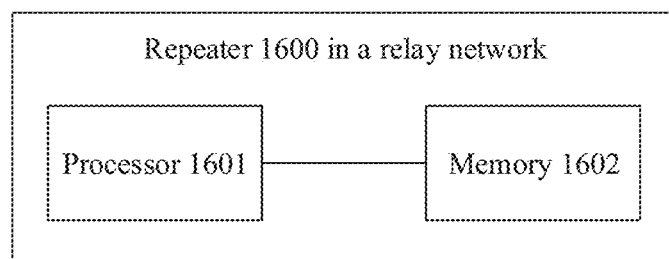

Based on the foregoing concept, as shown in FIG. 16, this application further discloses a repeater 1600 in a relay network. The repeater 1600 includes a processor 1601 and a memory 1602.

The memory 1602 stores a computer program instruction.

The processor 1601 is configured to execute the computer program instruction stored in the memory, to perform the steps performed by a repeater side in the foregoing method for constructing a relay network.

This application further provides a computer-readable storage medium. The computer-readable storage medium stores an instruction. When the instruction is run on a computer, the computer is enabled to perform the foregoing method for constructing a relay network.

Method or algorithm steps described in combination with the content disclosed in the present invention may be implemented by hardware or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to the processor, so that the processor can read information from the storage medium and write information into the storage medium. Certainly, the storage medium may alternatively be a component of the processor. The processor and the storage medium may be located in an ASIC. In addition, the ASIC may be located in user equipment. Certainly, the processor and the storage medium may alternatively exist in the user equipment as discrete components.

A person skilled in the art should be aware that in the foregoing one or more examples, functions described in the present invention may be implemented by hardware, software, firmware, or any combination thereof. When implemented by software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A radio frequency identification system, comprising a reader, a repeater, and a target tag, wherein:
the reader is configured to send a first signal to the repeater;
the repeater is configured to send an excitation signal to the target tag based on the first signal;
the target tag is configured to send a target backscatter signal based on excitation of the excitation signal, wherein the target backscatter signal carries electronic product code information; and
the reader is further configured to:
receive the target backscatter signal,
obtain the electronic product code information in the target backscatter signal,
send first information to the repeater, wherein the first information is used to notify the repeater to start synchronization,
receive second information sent by the repeater, wherein the second information is used for synchronization adjustment between the reader and the repeater,
calculate a synchronization adjustment offset between the reader and the repeater based on the second information, and
send third information to the repeater, wherein the third information carries the synchronization adjustment offset between the reader and the repeater, and wherein the third information is used by the repeater to perform the synchronization adjustment, to maintain synchronization with the reader.

2. The system according to claim 1, wherein the first signal carries an excitation parameter, and wherein when sending the excitation signal to the target tag based on the first signal, the repeater is configured to:
obtain the excitation parameter from the first signal;
generate the excitation signal based on the excitation parameter; and
send the excitation signal to the target tag.

3. The system according to claim 2, wherein:
the repeater receives, at a first frequency, the first signal sent by the reader; and
the repeater sends the excitation signal to the target tag at a second frequency.

4. The system according to claim 1, wherein when sending the excitation signal to the target tag based on the first signal, the repeater is configured to:
receive the first signal sent by the reader; and
send the first signal to the target tag, wherein the first signal is the excitation signal.

5. The system according to claim 1, wherein when sending the target backscatter signal based on the excitation of the excitation signal, the target tag is configured to:
 directly send the target backscatter signal to the reader based on the excitation of the excitation signal.

6. The system according to claim 1, wherein when sending the target backscatter signal based on the excitation of the excitation signal, the target tag is configured to:
 send the target backscatter signal to the repeater based on the excitation of the excitation signal; and
 the repeater is further configured to send the target backscatter signal to the reader.

7. The system according to claim 1, wherein:
 the system further comprises a reference tag;
 the repeater is further configured to send the excitation signal to the reference tag based on the first signal;
 the reference tag is configured to send a reference backscatter signal based on the excitation signal; and
 the reader is further configured to:
  determine, based on the reference backscatter signal and the target backscatter signal, a location relationship between the reference tag and the target tag; and
  determine, based on the location relationship between the reference tag and the target tag and location information of the reference tag, location information of the target tag.

8. A method for constructing a relay network, wherein the relay network comprises a reader and at least one repeater, and wherein the method comprises:
 receiving, by the reader, identification information reported by a repeater of the at least one repeater, wherein the identification information is used to uniquely identify the repeater;
 determining, by the reader and based on the identification information reported by the repeater, whether the repeater is legal;
 sending, by the reader, first information to the repeater in response to determining that the repeater is legal, wherein the first information is used to notify the repeater to connect to the relay network;
 sending, by the reader, second information to the repeater, wherein the second information is used to notify the repeater to start synchronization;
 receiving, by the reader, third information sent by the repeater, wherein the third information is used for synchronization adjustment between the reader and the repeater;
 calculating, by the reader, a synchronization adjustment offset between the reader and the repeater based on the third information; and
 sending, by the reader, fourth information to the repeater, wherein the fourth information carries the synchronization adjustment offset between the reader and the repeater, and wherein the fourth information is used by the repeater to perform the synchronization adjustment, to maintain synchronization with the reader.

9. The method according to claim 8, wherein before receiving, by the reader, identification information reported by the repeater, the method further comprises:
 sending, by the reader, fifth information, wherein the fifth information is used to notify the repeater to report the identification information.

10. The method according to claim 8, wherein the relay network comprises a plurality of repeaters, wherein the method further comprises:
 scheduling, by the reader in a manner comprising at least one of a frequency division multiple access manner, a time division multiple access manner, or a code division multiple access manner, each of the plurality of repeaters to send a respective excitation signal to a respective target tag, wherein the respective excitation signal is used to excite the respective target tag to send a respective backscatter signal.

11. The method according to claim 8, comprising:
 sending a first signal to the repeater;
 receiving a target backscatter signal; and
 obtaining electronic product code information in the target backscatter signal.

12. A method for constructing a relay network, wherein the relay network comprises a reader and at least one repeater, and wherein the method comprises:
 obtaining, by a repeater of the at least one repeater, identification information of the repeater, wherein the identification information is used to uniquely identify the repeater;
 reporting, by the repeater, the identification information;
 receiving, by the repeater, first information sent by the reader, wherein the first information is used to notify the repeater to start synchronization;
 sending, by the repeater, second information, wherein the second information is used for synchronization adjustment between the reader and the repeater;
 receiving, by the repeater, third information sent by the reader, wherein the third information carries a synchronization adjustment offset between the reader and the repeater; and
 maintaining, by the repeater, synchronization with the reader based on the synchronization adjustment offset carried in the third information.

13. The method according to claim 12, wherein before reporting, by the repeater, the identification information, the method further comprises:
 receiving, by the repeater, fourth information sent by the reader, wherein the fourth information is used to notify the repeater to report the identification information.

14. The method according to claim 12, comprising:
 receiving a first signal from the reader; and
 sending an excitation signal to a target tag based on the first signal.

15. A reader in a relay network, wherein the relay network further comprises at least one repeater, and wherein the reader comprises:
 a memory storing instructions; and
 at least one processor coupled to the memory to execute the instructions to:
  receive identification information reported by a repeater of the at least one repeater, wherein the identification information is used to uniquely identify the repeater;
  determine, based on the identification information reported by the repeater, whether the repeater is legal; and
  send first information to the repeater in response to determining that the repeater is legal, wherein the first information is used to notify the repeater to connect to the relay network;
  send second information to the repeater, wherein the second information is used to notify the repeater to start synchronization;
  receive third information sent by the repeater, wherein the third information is used for synchronization adjustment between the reader and the repeater;

calculate a synchronization adjustment offset between the reader and the repeater based on the third information; and send fourth information to the repeater, wherein the fourth information carries the synchronization adjustment offset between the reader and the repeater, and wherein the fourth information is used by the repeater to perform the synchronization adjustment, to maintain synchronization with the reader.

16. The reader according to claim 15, wherein the at least one processor further executes the instructions to:

send fifth information before receiving the identification information reported by the repeater, wherein the fifth information is used to notify the repeater to report the identification information.

17. The reader according to claim 15, wherein the relay network comprises a plurality of repeaters, wherein the processor further executes the instructions to:

schedule, in a manner comprising at least one of a frequency division multiple access manner, a time division multiple access manner, or a code division multiple access manner, each of the plurality of repeaters to send a respective excitation signal to a respective target tag, wherein the respective excitation signal is used to excite the respective target tag to send a respective backscatter signal.

18. The reader according to claim 15, wherein the at least one processor further executes the instructions to:

send a first signal to the repeater;

receive a target backscatter signal; and obtain electronic product code information in the target backscatter signal.

19. A repeater in a relay network, wherein the relay network further comprises a reader, and wherein the repeater comprises:

a memory storing instructions; and at least one processor coupled to the memory to execute the instructions to:

obtain identification information of the repeater, wherein the identification information is used to uniquely identify the repeater;

report the identification informations;

receive first information sent by the reader, wherein the first information is used to notify the repeater to start synchronization;

send second information, wherein the second information is used for synchronization adjustment between the reader and the repeater;

receive third information sent by the reader, wherein the third information carries a synchronization adjustment offset between the reader and the repeater; and maintain synchronization with the reader based on the synchronization adjustment offset carried in the third information.

20. The repeater according to claim 19, wherein the at least one processor further executes the instructions to receive, before reporting the identification information, fourth information sent by the reader, wherein the second information is used to notify the repeater to report the identification information.

* * * * *

UNITED STATES PATENT AND TRADEMARK OFFICE
CERTIFICATE OF CORRECTION

PATENT NO. : 11,328,135 B2
APPLICATION NO. : 17/030915
DATED : May 10, 2022
INVENTOR(S) : Huaizhi Zhang et al.

It is certified that error appears in the above-identified patent and that said Letters Patent is hereby corrected as shown below:

In the Claims

In Column 18 Line 12 (Approx.), In Claim 19, delete "informations;" and insert -- information; --.

Signed and Sealed this
Sixteenth Day of August, 2022

Katherine Kelly Vidal
*Director of the United States Patent and Trademark Office*